No. 744,327. PATENTED NOV. 17, 1903.
H. C. FROST & G. M. STADELMAN.
VULCANIZER.
APPLICATION FILED FEB. 24, 1903.
NO MODEL.
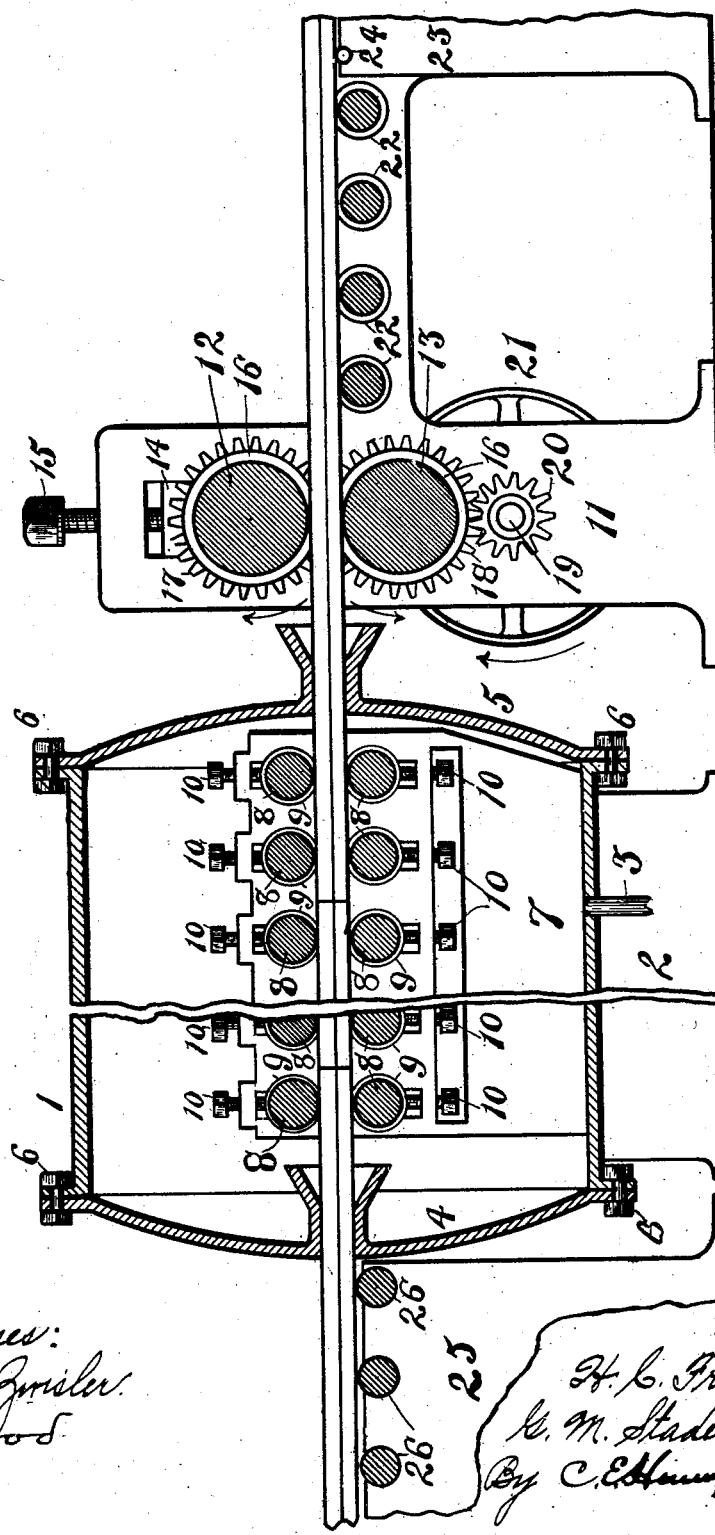

No. 744,327. Patented November 17, 1903.

UNITED STATES PATENT OFFICE.

HARRISON C. FROST AND GEORGE M. STADELMAN, OF AKRON, OHIO.

VULCANIZER.

SPECIFICATION forming part of Letters Patent No. 744,327, dated November 17, 1903.

Application filed February 24, 1903. Serial No. 144,741. (No model.)

*To all whom it may concern:*

Be it known that we, HARRISON C. FROST and GEORGE M. STADELMAN, citizens of the United States, residing at Akron, in the county of Summit and State of Ohio, have invented a certain new and useful Improvement in Vulcanizers, of which the following is a complete specification.

Our invention has relation to the production of a vulcanizer for vulcanizing india-rubber and similar products.

The objects of our invention are to produce a vulcanizer in which long articles, such as tires, which are commonly vulcanized in separate molds, may be rapidly and economically vulcanized and in which the repeated cooling and heating of the vulcanizer is obviated and the necessity of bolting together the two halves of the molds containing rubber articles is entirely eliminated.

Heretofore the common means by which articles and especially long ones, such as rubber tires, are vulcanized has been to place the tires in long metallic boxes, bolt thereto a cover or lid by a large number of bolts, varying from fifteen to thirty-two, and transport the mold into the vulcanizer, in company with others, and then close the vulcanizer by means of from five to twenty bolts, turn steam into the vulcanizer until a sufficient degree of heat is reached, which is kept up for a definite time. This is followed by the shutting off of the steam-supply, the removal of the bolts from the head of the vulcanizer, and cooling by means of a stream of water thrown into the interior of the vulcanizer and onto the molds, the removal of the molds from the vulcanizer and the unloosening of all the bolts which hold the molds together, the removal of the lid and the contents of the mold. After this operation the molds are refilled and the process repeated. The handling of the molds with their bolts and the repeated loosening thereof requires time and expense and the repeated heating and cooling of the vulcanizer requires a large quantity of steam, together with the fact that the molds and vulcanizer must be brought to a certain degree of heat before vulcanization takes place. In utilizing our machine for this purpose we expect to do away with the loosening of the bolts on the molds and vulcanizer entirely.

To the accomplishment of the aforesaid objects our invention consists in the peculiar and novel construction, arrangement, and combination of the parts hereinafter described, and then specifically claimed, reference being had to the accompanying drawing, forming a part hereof.

The drawing represents a longitudinal section of our improved vulcanizer and its accompanying mechanism for feeding molds through it.

In the drawing, 1 is a hollow cylinder whose length is to be determined by the length of time necessary for the vulcanization of articles placed therein. This cylinder 1 is supported on a base 2 and has projecting into it an inlet steam-pipe 3. It is provided on both ends with convex heads 4 5, which are held to the body of the vulcanizer by bolts 6. In the central portion of the heads 4 5 are openings having flaring mouths projecting in the same direction, the internal bore of which openings is identical with the external configuration of the molds in which the rubber articles are placed for vulcanization. The openings in the heads 4 5 are in precise horizontal alinement with one another, so that an object passed squarely through the opening in the head 5 will pass through the vulcanizer and out through the opening in the head 4, and if the object thus passed through the two heads is of proper size it will substantially seal these two openings against the escape of steam from the vulcanizer.

Within the vulcanizer are a pair of upright housings 7, one only of which is shown in the drawing. Extending between the housings 7 are a series of rolls 8, having on their outer ends flanges 9 for the purpose of directing the course of an object passed between each pair. The rollers 8 are mounted in suitable boxes in the housings, and these boxes are capable of vertical adjustment by means of the adjusting-screws 10, so that the rollers 8 may serve simply as guides to direct the passage of an object—as, for instance, a mold— or they may be utilized to compress with considerable force the object thus guided. Immediately in front of the head 5 are a pair of housings 11, one only of which is shown by reason of the fact that the drawing is a section. Extending between the housings 11 are two feed-rollers 12 13, one at least being mounted in horizontal adjustable boxes 14, whose vertical position is determined by an adjusting-screw 15. On both sides of the rollers 12 13 are flanges or collars 16 to direct the passage of an object between the rollers. Mounted on the ends of the rollers and integral therewith or not, as preferred, are spur-gears 17 18, designed to intermesh and to rotate in unison. Also mounted in the housings 11 is a horizontal shaft 19, on the inner end of which is a spur-pinion 20, arranged to mesh into the gear 18. On the outer end on the shaft 19 is a pulley 21, over which may be placed a belt for the purpose of transmitting power thereto. Also extended between the housings 11 are supporting-rollers 22 to support an object to be fed forward to the feed-rolls 12 13. These rolls 22 are provided with flanges on both ends to steady an object passing over them.

To the right in the drawing and integral with the housings 11, if desired, is a work-table 23, having partly sunken rollers 24, on which table it is designed to fill the molds previous to vulcanization.

To the left of the head 4 of the vulcanizer is a table or support 25, having on its upper surface rollers 26 to receive the molds as they issue from the vulcanizer.

The operation of the device is as follows: Power being applied to the pulley 20 by any preferred means, gears 12 13 are rotated in the direction of the arrows. In the meantime a series of long slender molds containing rubber articles are properly filled with material for vulcanization upon the work-table 23, and one of them is pushed forward over the rollers 22 between the feed-rolls 12 13, by which the mold is seized and fed slowly forward into the flaring opening in the vulcanizer-head 5. As the mold slowly proceeds it passes between the rolls 8, and finally reaches the opening in the vulcanizer-head 4. As soon as one mold has been placed into operative engagement with the feed-rollers 12 a second one is pushed forward by hand until it abuts against the rear of the first one preceding it, and the mold receiving the motive power from the feed-rollers 12 13 serves to push forward the one immediately in advance of it after the first one has passed beyond reach of the rollers 12 13. At the time that the front end of the first mold reaches the opening in the vulcanizer-head 4 and passes therein the power applied to the feed-rolls is removed, steam is turned into the vulcanizer and maintained there until the articles situated in the molds within the vulcanizer at that time are thoroughly cured, then the feed-rolls are caused to recommence their motion with a very slow speed, and the molds containing the cured products are pushed by those succeeding them out through the head 4 onto the receiving platform or table 25. After the articles in the first set of molds have been cured it is not necessary to arrest the feed of the rollers 12 13 at all until work ceases for the day, as molds will be pushed forward by hand to succeed those ahead, thereby keeping the openings in the heads 4 5 of the vulcanizer completely closed at all times.

What we claim, and desire to secure by Letters Patent, is—

1. The combination in a device of the class designated of a hollow vulcanizer, means to heat said vulcanizer, openings in substantial alinement with each other in each of the heads of the vulcanizer, a housing mounted within said vulcanizer, vertically-disposed rolls mounted in said housing, means mounted outside of said vulcanizer to simultaneously compress and force forward molds containing articles to be vulcanized with a series of molds containing articles properly filled for vulcanization, substantially as shown and described.

2. The combination with a hollow vulcanizer capable of being heated, a housing mounted within said vulcanizer, guide and pressing rollers mounted in said housing, feeding and compressing rolls mounted outside of said vulcanizer, of molds having substantially the same exterior dimensions arranged to be forced by said feeding-rolls through said vulcanizer and between said pressing and guiding rolls.

In testimony that we claim the above we hereunto set our hands in the presence of two subscribing witnesses.

HARRISON C. FROST.
GEORGE M. STADELMAN.

In presence of—
  C. E. HUMPHREY,
  MAUDE ZWISLER.